No. 885,780. PATENTED APR. 28, 1908.
L. OLSCHEWSKI & F. TRENSCH.
CAR FENDER.
APPLICATION FILED JULY 26, 1907.

WITNESSES:

INVENTORS:
Leo Olschewski and
Frank Trensch,
BY
Fraentzel and Richards,
ATTORNEYS No. 885,780. PATENTED APR. 28, 1908.
L. OLSCHEWSKI & F. TRENSCH.
CAR FENDER.
APPLICATION FILED JULY 26, 1907.

WITNESSES:
F.H.W. Fraentzel
Anna H. Alter

INVENTORS:
Leo Olschewski and
Frank Trensch,
BY Fraentzel and Richards,
ATTORNEYS No. 885,780. PATENTED APR. 28, 1908.
L. OLSCHEWSKI & F. TRENSCH.
CAR FENDER.
APPLICATION FILED JULY 26, 1907.

WITNESSES:
F. H. W. Fraentzel
Anna H. Alter

INVENTORS:
Leo Olschewski and
Frank Trensch,
BY
Fraentzel and Richards,
ATTORNEYS

No. 885,780. PATENTED APR. 28, 1908.
L. OLSCHEWSKI & F. TRENSCH.
CAR FENDER.
APPLICATION FILED JULY 26, 1907.

WITNESSES:

INVENTORS:
Leo Olschewski and
Frank Trensch,
BY
Fraentzel and Richards,
ATTORNEYS

UNITED STATES PATENT OFFICE.

LEO OLSCHEWSKI AND FRANK TRENSCH, OF NEWARK, NEW JERSEY.

CAR-FENDER.

No. 885,780.      Specification of Letters Patent.      Patented April 28, 1908.

Application filed July 26, 1907. Serial No. 385,622.

*To all whom it may concern:*

Be it known that we, LEO OLSCHEWSKI and FRANK TRENSCH, citizens of the United States, residing at Newark, in the county of Essex and State of New Jersey, have invented certain new and useful Improvements in Car-Fenders; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to fenders or life-guards for railway-cars, such as electric, cable and other surface-cars; and, the invention has reference, more particularly, to a novel fender comprising two suitably arranged fender guards, which are rigidly set one over the other, but both of which collapse, when the upper one of the said guards comes in contact with an object, and the lower guard automatically dropping at its front end to the ground, so that the object or person struck is immediately taken upon said lower fender-guard or frame.

The present invention has for its principal object to provide a simply constructed fender, which is of convenient application upon either end of a car, is adjustable, and provides an automatic and perfectly operating device of the general character hereinafter specified, the fender being especially designed for the protection of human beings from loss of life or serious injury.

The invention consists in the novel construction of car-fender hereinafter set forth; and, furthermore, this invention consists in the arrangements and combination of the various devices and parts, as well as in the details of the construction of the same, all of which will be more fully described in the following specification and then finally embodied in the clauses of the claims which are appended to and which form an essential part of this specification.

The invention is clearly illustrated in the accompanying drawings, in which:—

Fig. 5$^a$ is a detail sectional representation, taken on line 5$^a$—5$^a$ in said Fig. 3, looking in a downward direction, and said view being made on an enlarged scale.

Similar characters of reference are employed in all of the above described views, to indicate corresponding parts.

Referring now to the several figures of the drawings, the reference-character 1 indicates a portion of the body of a car, and 2 is any suitable form of bumper-iron, suitably secured upon the end of said body. Suitably secured upon the bottom of said body, near each side of the same, by means of bolts or screws 3, are a pair of brackets or supports 4, provided at one end with suitably formed bearing-portions or members 5, substantially of the construction shown in several figures of the drawings.

The reference-character 6 indicates a laterally extending bar or beam, which is preferably of a rectangular cross-section, as shown, except at two points, where the said bar or beam is provided with the cylindrical parts 7. These cylindrical parts 7 rest in the bearing-portions 5, and are capable of slight oscillatory or rocking motions within said bearing-portions, substantially in the manner of and for the purposes to be presently more fully set forth. Suitably secured in position upon said rock-bar or beam 6, by means of bolts or screws 8, are a pair of rearwardly extending lifting members or carriers 9, the same preferably comprising suitably constructed spring-members which are usually made ⊂-shaped, as at 10, and are provided with upwardly projecting arms 11, carrying at their free ends suitably grooved rollers or small wheels 12. Other brackets or supports 13 are secured by means of bolts or screws 14 to the said rock-bar or beam 6, said brackets extending in front of said beam or bar and being formed with a pair of arms 15 and 16 which extend in opposite directions, substantially in the manner illustrated in Figs. 4, 5, 7 and 8 of the drawings. The free end-portions of said arms 15 and 16 are suitably secured to the respective cross-rods or bars 17 and 18 of a lower or drop-fender, which consists, in addition to these cross-rods 17 and 18 of a pair of downwardly and forwardly extending side-members or rods 19, and the intermediately disposed and similarly formed braces 20, all of which are suitably connected at their forward end-portions with any desired number of cross-rods, as 21, upon some of which are revolubly arranged suitably constructed rollers 22 which are made from any material suitable for the purposes of this invention.

Suitably secured upon the under surface or bottom of the body 1, near the sides thereof, by means of bolts or screws 23 are suitably constructed supports or brackets 24, each support comprising a pair of downwardly extending elements or lugs 25, provided with a pair of laterally extending pins 26 and 27, upon which are respectively mounted the grooved rollers or wheels 28 and 29. Movable longitudinally between each pair of said rollers 28 and 29 of each pair of supports or brackets 24, are cylindrical rods 30, their forward end-portions projecting from suitable openings in the bumper-iron, and being provided at the free ends of said end-portions with suitably formed and preferably hook-shaped holding or retaining clamping members, as 31, for the purposes to be presently more fully described. Another pair of supports or brackets 33 are secured by means of bolts or screw 34 upon the bottom or under surface of the car-body 1, each support comprising a pair of downwardly extending elements or lugs 35 provided with the laterally extending pins 36 upon which are mounted the grooved rollers or wheels 37.

Figure 1:
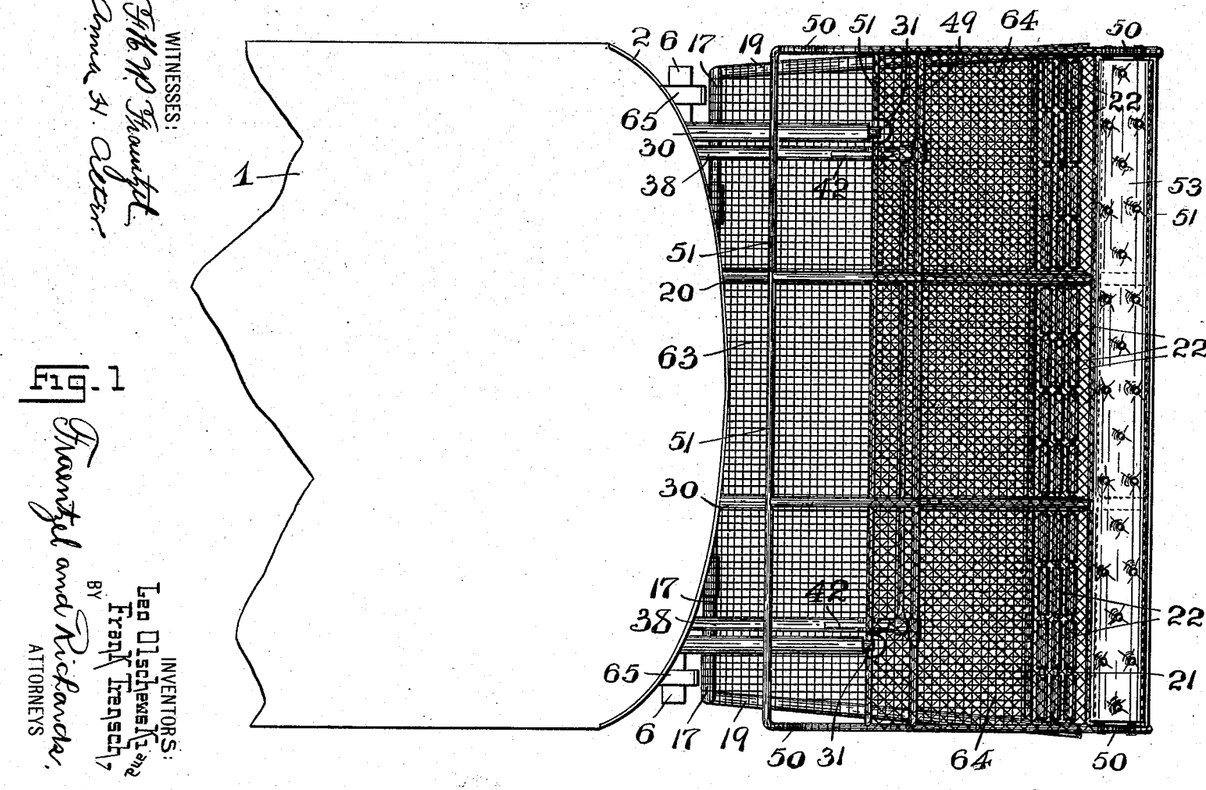
Figure 1 is a top or plan view of a fender embodying the principles of our present invention, showing the same in its operative relation with the one end of the body of a car, a portion of which is shown in plan view in said figure.
Figure 2:
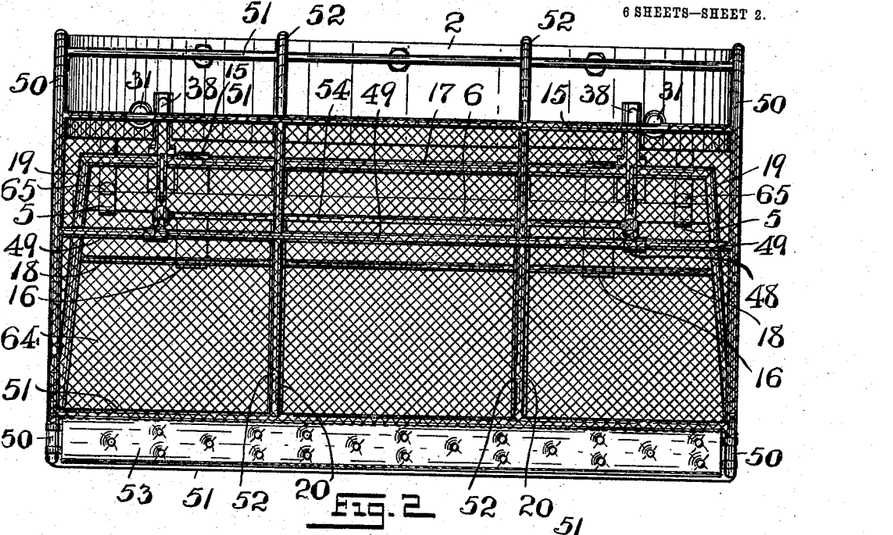
Fig. 2 is a front view of the fender elements represented in said Fig. 1.
Figure 3:
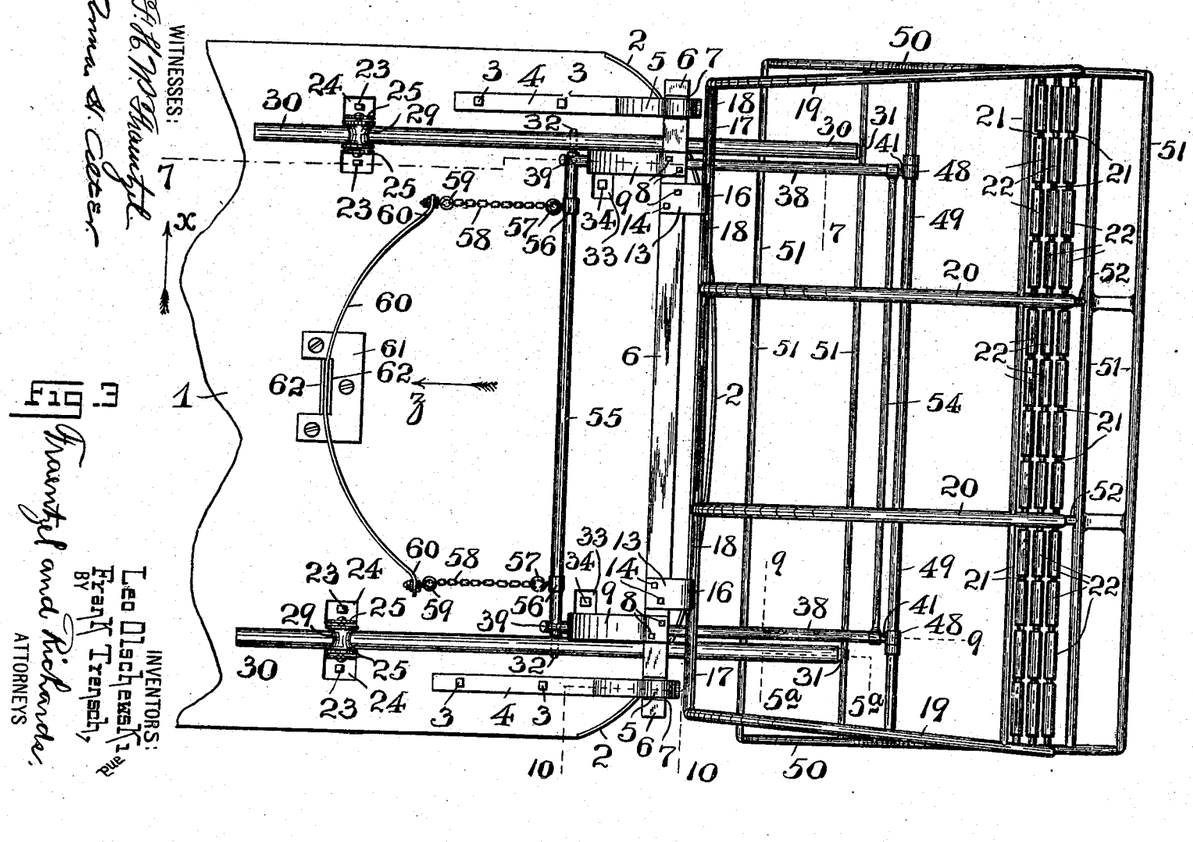
Fig. 3 is a bottom view of the fender, showing the various parts in their operative positions represented in said Figs. 1 and 2, the netting with which the fender-guards are provided being omitted from this view.

Movably arranged between each pair of lugs 35 and upon each grooved roller or wheel 37 are the rods 38, each rod 38 being slightly bent at its rear end, as at 39, the said rods each being provided at said ends with laterally or outwardly extending pivots, as 32, providing journals which extend through suitably disposed holes or bearing-portions of the rods 30, substantially as shown in Fig. 3 of the drawings, and whereby the said rods 38, while being capable of oscillatory movements, are also capable of reciprocatory movements simultaneous with those of the rods 30, as will be clearly evident.

At its forward end-portion each rod 38 is made tubular or is provided with a receiving socket 40. Removably arranged within each socket or tubular portion 40 is a short rod 41, which is held therein by means of the nosing 43 of a latch-lever or dog 42 which is fulcrumed upon a pin 44 between a pair of ears or lugs 45 upon each rod 38, a spring 46 being employed for normally forcing the nosings 43 of said latch-levers or dogs 42 into receiving holes 47 in said rods 38, as clearly shown in Fig. 9 of the drawings. Each short rod 41 is provided at its free end with an eye or ring-shaped member 48 in which is hinged or pivoted a cross-rod 49 of the upper or swinging fender-element or guard. This fender-element or guard consists of the said cross-rods 49 and the two side-bars or rods 50, which are preferably curved or shaped substantially in the manner shown in the several figures of the drawings, other cross-rods or bars 51 and intermediate rods or bars 52 being provided as braces for giving rigidity and strength to said frame. Upon its lower portion the said upper or swinging fender-element or guard may be provided with a protecting cushion or pad, as 53, made in any desired manner and suitably secured to the members of the frame of said upper fender-element in any manner.

The two rods 38 are suitably connected at their tubular or socketed end-portions by a cross-bar or rod 54, and at their rear end-portions they are connected by means of a cross-rod or bar 55. Sleeves or other fixtures 56, provided with eyes or rings 57, are suitably disposed and secured in fixed positions upon said cross-rod or bar 55, each eye or ring having fastened thereto the one end of a flexible connection or chain 58. The opposite ends of said flexible connections or chains are secured to swivel or eye-bolts 59, suitably secured to and extending from the end-portions of a leaf or other spring 60, or springs. This spring 60 is secured in its operative position upon the lower face or bottom of the car-body 1, by means of a plate 61 having a pair of downwardly extending clamping or holding members 62 between which the central portion of said spring 60 is arranged and fastened in any suitable and well-known manner.

Portions of the lower and upper fender-elements or guards are suitably covered with screens or wire-mesh, as 63 and 64, so as to form basket-shaped life-guards, as will be clearly understood.

Figures 4, 5:
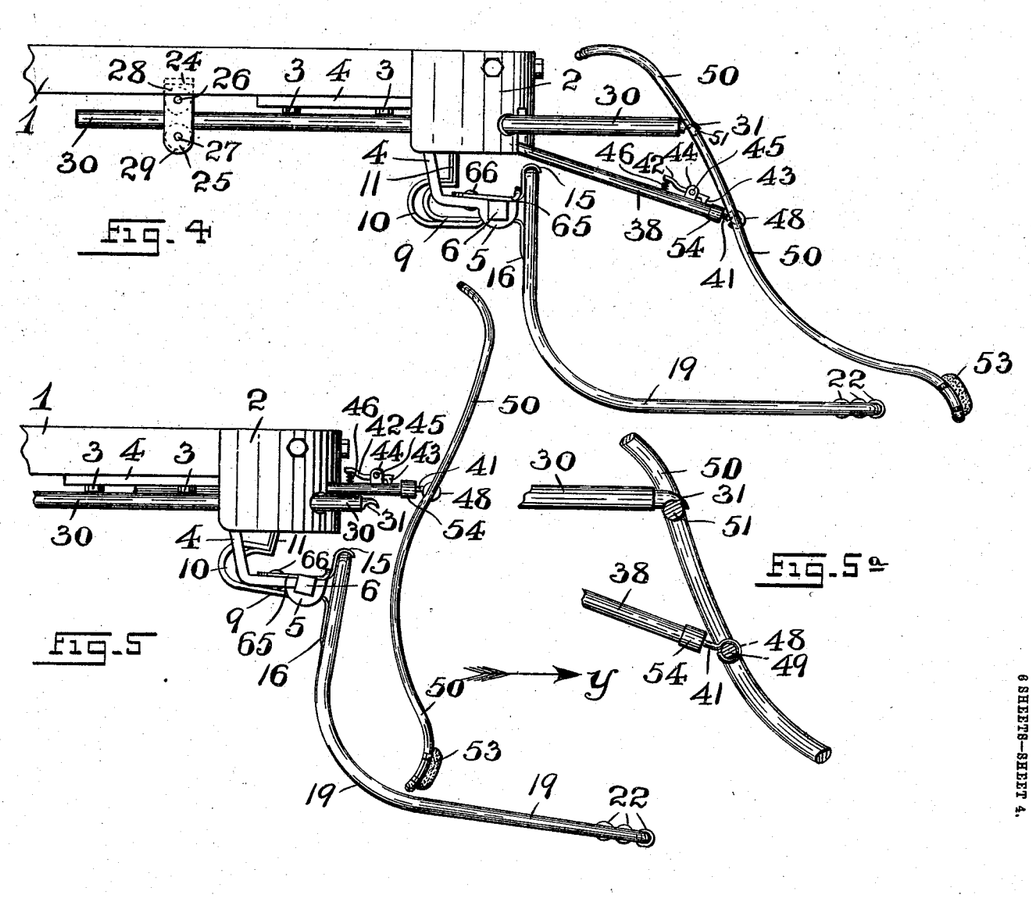
Fig 4 is a side view of the parts of the fender, when in the positions represented in said Figs. 1, 2 and 3.
Fig. 5 is a similar view of the fender, showing the respective positions of the two fender-guards, after an object has been struck.
Figure 6:
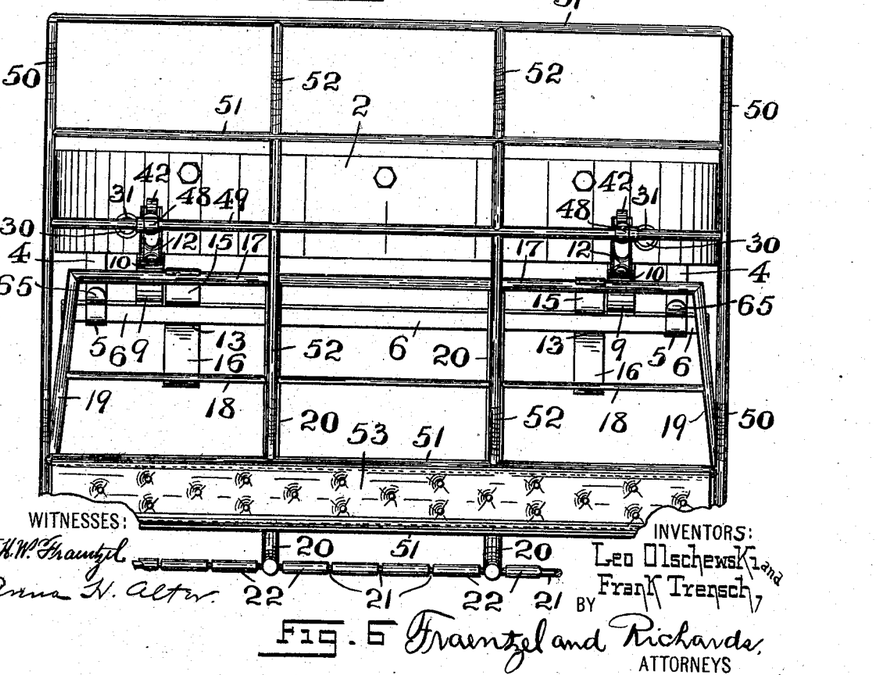
Fig. 6 is a front view of the fender, when the fender-elements are in the positions represented in said Fig. 5.
Figure 7:
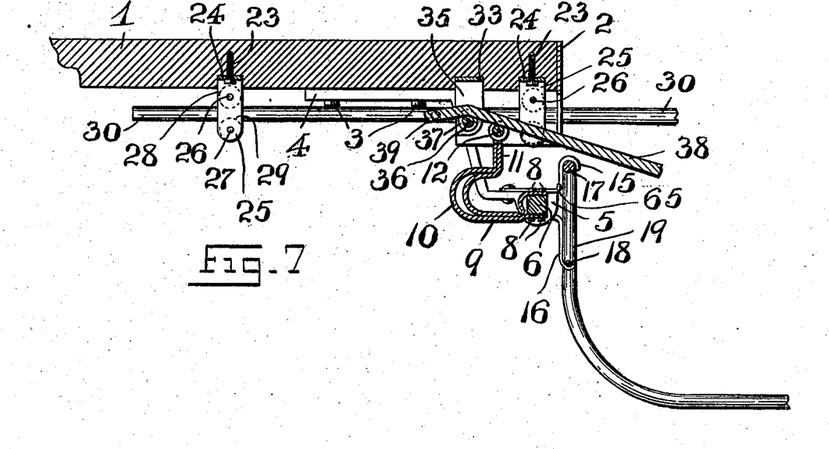
Fig. 7 is a vertical section taken on line 7—7 in said Fig. 3, looking in the direction of the arrow $x$, certain portions of the fender-elements being shown as broken away.
Figures 8, 9:
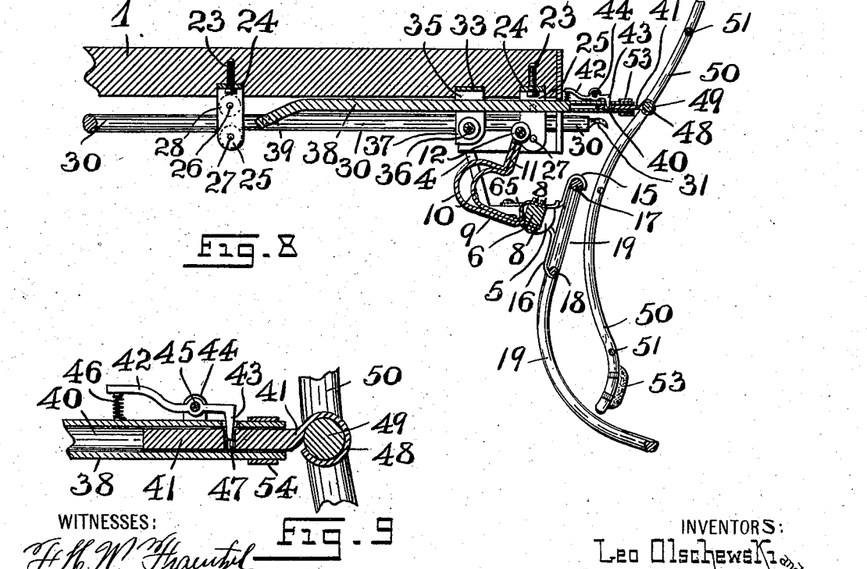
Fig. 8 is a similar section of the same parts, when in their released positions, indicated in Fig. 5.
Fig. 9 is a detail vertical section, taken on line 9—9 in said Fig. 3, looking in a downward direction, and said section being made on an enlarged scale.

Having thus described the general arrangements and constructions of the devices and parts comprising our novel fender, we will now briefly set forth the manner of setting up or fixing the two fender-elements or guards in their operative positions in front of the end of the car, and then also describe the manner of releasing the fender-elements so as to bring them from their normal positions represented in Figs. 1, 2, 4 and 7 to their operated and life-saving positions shown in Figs. 5, 6 and 8 of the drawings.

When the connected rods 30 and 38 have been pulled forward, and the two fender-elements or guards have been raised by the motor-man from their lowered positions shown in Fig. 5, and the parts are pulled forward in the direction of the arrow $y$ in said Fig. 5, they are readily brought into the relative positions represented in Fig. 4, and the hook-shaped holding or clamping members 31 of the rods 30 being forced over the cross-rod 51 located above the cross-rod 49 of the upper fender-element or guard, the result will be that the rods 38 will assume the downwardly extending or angular relations shown in Figs. 4, 5$^a$ and 7, the bent rear end-portions of said rods resting directly upon the rollers or wheels 37. At the same time, because of the binding relation produced by the fact that the rods 38 are journaled to the rods 30, and the retaining or clamping members 31 are firmly engaged by the cross-bar 51, the rear end-portions of said rods 38 will be caused to bear down upon the grooved rollers or wheels 12, whereby, by means of the carriers 9, a rocking movement of the bar or beam 6 in the bearing-portions 5 is caused, thus swinging the lower or drop fender-element into its raised position shown in said Figs. 4 and 7, and in which positions the several parts are positively held, until the lower front end-portion of the upper fender-frame or guard is forcibly brought in contact with an object or body upon the track upon which the car is running. When the parts are in these positions, the spring 60 is in the position shown in Fig. 3 of the drawings, the tendency of the spring being to draw the parts in the direction of the arrow $z$ in said Fig. 3, when the two hook-shaped holding or clamping members 31 of the rods 30 are forced from their holding or sustaining engagement with the cross-bar 51.

Figure 10:
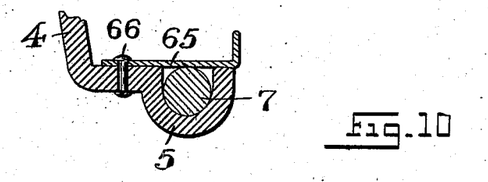
Fig. 10 is a detail vertical section, on an enlarged scale, said section being taken on line 10—10 in said Fig. 3, looking in a downward direction.
Figure 11:
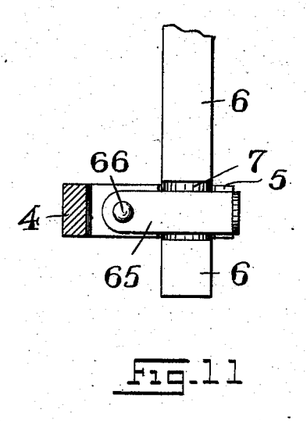
Fig. 11 is a plan view of the said parts.
Figure 12:
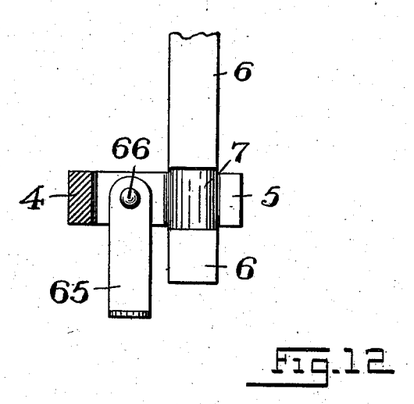
Fig. 12 is a similar view of the same parts, showing a pivoted retaining clamp or latch-plate turned to one side for the separation of said parts.
Figure 13:
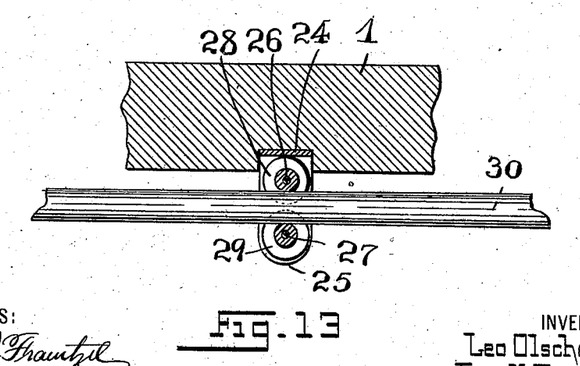
Fig. 13 is a detail vertical section, on an enlarged scale, said section being taken on line 13—13 in said Fig. 3, looking in a downward direction.

Now, suppose the forward end-portion of the upper fender-element, or its pad or cushion, comes in contact with an object or body upon the track. Immediately the impact sufficiently raises the bar 51 above the retaining or clamping members 31 of the rods 30, and the result is that the spring 60 pulls upon the cross-rod 55, whereby the rods 38 and the rods 30 connected therewith are returned to their inactive positions beneath the body of the car. The rods 38 now having again been lifted away from the rollers 12, the lower fender-element or guard assumes its dropped position, with its rollers 22 rolling directly upon the ground. The upper fender-element or guard, swinging freely upon the cross-rod or bar 49, assumes a substantially vertical relation, as shown in Figs. 5 and 8, thereby acting as a guard against being forced against the bumper-iron of the car-body, when taken up by the dropped lower fender-element or guard. When it is desired to disconnect the two fender-elements or guards from the said rods 38 and 30, to permit them to be connected with a similar arrangement of rods at the other end of the car-body, all that is necessary is to disconnect the nosings 43 of the latch-dogs 42 from the receiving holes 47 of the rods 38, thus permitting the withdrawal of the short rods 41 from the sockets 40. The rock-bar or beam 6, with which the lower or drop fender-element is connected is then lifted from the bearing-portions 5, when suitable latch-plates 65 which are pivoted at one end, as at 66 to said brackets or supports 4, see Figs. 10, 11 and 12, are moved from the position indicated in said Figs. 10 and 11, to that represented in Fig. 12 of the drawings. The two fender-elements or guards can then be brought into their operative relations with other rods or bars at the other end of the car-body, in the same manner as has been hereinbefore described.

We are fully aware that changes may be made in the various arrangements and combinations of the devices and parts without departing from the scope of the present invention as defined in the appended claims. Hence we do not limit our invention to the exact arrangement and combinations of the devices, nor to the exact details of the construction of the parts as illustrated in the accompanying drawings and as described in the specification.

We claim:

1. A fender for cars comprising two sets of rods extending longitudinally beneath the body of a car, and a pair of fender-elements or guards, one of said fender-elements being pivotally connected with one set of said rods, and said other set of rods being adapted to be brought in retaining engagement with portions of said fender-element to retain said fender-element in its operative relation, and means connected with said second fender-element adapted to be engaged by said first-mentioned set of rods to retain said second fender-element in its raised position, substantially as and for the purposes set forth.

2. A fender for cars comprising two sets of rods extending longitudinally beneath the body of a car, and a pair of fender-elements or guards, one of said fender-elements being pivotally connected with one set of said rods, and said other set of rods being adapted to be brought in retaining engagement with portions of said fender-element to retain said fender-element in its operative relation, a pair of upwardly extending carriers, and a roller upon each carrier with which the said rods which carry said first-mentioned fender-element are adapted to be brought in engagement for retaining said second fender-element in its raised position, substantially as and for the purposes set forth.

3. A fender for cars comprising two sets of rods extending longitudinally beneath the body of a car, one of said sets of rods being pivotally connected with said other set of rods, and both sets of rods being capable of reciprocatory movements, and a pair of fender-elements or guards, one of said fender-elements being pivotally connected with said set of pivotally connected rods, and said other set being adapted to be brought in retaining engagement with portions of said fender-element to retain said fender-element in its operative relation, and means connected with said second fender-element adapted to be engaged by said pivotally connected set of rods, substantially as and for the purposes set forth.

4. A fender for cars comprising two sets of rods extending longitudinally beneath the body of a car, one of said sets of rods being pivotally connected with said other set of rods, and both sets of rods being capable of reciprocatory movements, and a pair of fender-elements or guards, one of said fender-elements being pivotally connected with said set of pivotally connected rods, and said other set being adapted to be brought in retaining engagement with portions of said fender-element to retain said fender-element in its operative relation, a pair of upwardly extending carriers, and a roller upon each carrier with which said set of pivotally connected rods are adapted to be brought in engagement for retaining said second fender-element in its raised position, substantially as and for the purposes set forth.

5. A fender for cars comprising two sets of rods extending longitudinally beneath the body of a car, an upper fender-element pivotally connected with one set of said rods, and said other set of rods being adapted to be brought in retaining engagement with portions of said fender-element to retain it in its operative relation, supports extending from the body of the car, each support being provided with a bearing-portion, a rock-bar mounted in said bearing-portions, and a drop-fender or guard connected with said rock-bar, substantially as and for the purposes set forth.

6. A fender for cars comprising two sets of rods extending longitudinally beneath the body of a car, an upper fender-element pivotally connected with one set of said rods, and said other set of rods being adapted to be brought in retaining engagement with portions of said fender-element to retain it in its operative relation, supports extending from the body of the car, each support being provided with a bearing-portion, a rock-bar mounted in said bearing-portions, and a drop-fender or guard connected with said rock-bar, and means connected with said rock-bar adapted to be engaged by the said set of rods with which the upper fender-element is connected to retain said drop-fender or guard in its raised position, substantially as and for the purposes set forth.

7. A fender for cars comprising two sets of rods extending longitudinally beneath the body of a car, an upper fender-element pivotally connected with one set of said rods, and said other set of rods being adapted to be brought in retaining engagement with portions of said fender-element to retain it in its operative relation, supports extending from the body of the car, each support being provided with a bearing-portion, a rock-bar mounted in said bearing-portions, and a drop-fender or guard connected with said rock-bar, a pair of upwardly extending carriers connected with said rock-bar, and a roller upon each carrier with which the rods which carry the upper fender-element are adapted to be brought in engagement for retaining said drop-fender in its raised position, substantially as and for the purposes set forth.

8. A fender for cars comprising two sets of rods extending longitudinally beneath the body of a car, one of said sets of rods being pivotally connected with said other set of rods, and both sets of rods being capable of reciprocatory movements, an upper fender-element pivotally connected with said set of pivotally connected rods, and said other set being adapted to be brought in retaining engagement with portions of said upper fender element to retain it in its operative relation, supports extending from the body of the car, each support being provided with a bearing-portion, a rock-bar mounted in said bearing-portions, and a drop-fender connected with said rock-bar, substantially as and for the purposes set forth.

9. A fender for cars comprising two sets of rods extending longitudinally beneath the body of a car, one of said sets of rods being pivotally connected with said other set of rods, and both sets of rods being capable of reciprocatory movements, an upper fender-element pivotally connected with said set of pivotally connected rods, and said other set being adapted to be brought in retaining engagement with portions of said upper fender element to retain it in its operative relation, supports extending from the body of the car, each support being provided with a bearing-portion, a rock-bar mounted in said bearing-portions, and a drop-fender connected with said rock-bar, and means connected with said rock-bar adapted to be engaged by the said set of rods with which the upper fender-element is connected to retain said drop-fender or guard in its raised position, substantially as and for the purposes set forth.

10. A fender for cars comprising two sets of rods extending longitudinally beneath the body of a car, one of said sets of rods being pivotally connected with said other set of rods, and both sets of rods being capable of reciprocatory movements, an upper fender-element pivotally connected with said set of pivotally connected rods, and said other set being adapted to be brought in retaining engagement with portions of said upper fender element to retain it in its operative relation, supports extending from the body of the car, each support being provided with a bearing-portion, a rock-bar mounted in said bearing-portions, and a drop-fender connected with said rock-bar, a pair of upwardly extending carriers connected with said rock-bar, and a roller upon each carrier with which the rods which carry the upper fender-element are adapted to be brought in engagement for retaining said drop-fender in its raised position, substantially as and for the purposes set forth.

11. In a fender for cars, in combination, a series of brackets adapted to be secured to the bottom of a car-body, a pair of grooved rollers carried by each bracket, rods 30 movably arranged between said rollers, another set of brackets extending from the bottom of the car-body, grooved rollers carried by said brackets, rods 38 movably arranged over said rollers, said rods 38 being pivotally connected with said rods 30, an upper fender-frame pivotally connected with the free end-portions of said rods 38, a retaining-clamping element upon the free end of each rod 30 adapted to be brought in holding engagement with a portion of said upper fender-element to retain it in its operative relation, a series of other supports adapted to be secured to and extending from the bottom of the car-body, each support being provided with a bearing-portion, a rock-bar mounted in said bearing-portions, and a drop-fender or guard connected with said rock-bar, substantially as and for the purposes set forth.

12. In a fender for cars, in combination, a series of brackets adapted to be secured to the bottom of a car-body, a pair of grooved rollers carried by each bracket, rods 30 movably arranged between said rollers, another set of brackets extending from the bottom of the car-body, grooved rollers carried by said brackets, rods 38 movably arranged over said rollers, said rods 38 being pivotally connected with said rods 30, an upper fender-frame pivotally connected with the free end-portions of said rods 38, a retaining-clamping element upon the free end of each rod 30 adapted to be brought in holding engagement with a portion of said upper fender-element to retain it in its operative relation, a series of other supports adapted to be secured to and extending from the bottom of the car-body, each support being provided with a bearing-portion, a rock-bar mounted in said bearing-portions, and a drop-fender or guard connected with said rock-bar, and means connected with said rock-bar adapted to be engaged by the said set of rods with which the upper fender-element is connected to retain said drop-fender or guard in its raised position, substantially as and for the purposes set forth.

13. In a fender for cars, in combination, a series of brackets adapted to be secured to the bottom of a car-body, a pair of grooved rollers carried by each bracket, rods 30 movably arranged between said rollers, another set of brackets extending from the bottom of the car-body, grooved rollers carried by said brackets, rods 38 movably arranged over said rollers, said rods 38 being pivotally connected with said rods 30, an upper fender-frame pivotally connected with the free end-portions of said rods 38, a retaining-clamping element upon the free end of each rod 30 adapted to be brought in holding engagement with a portion of said upper fender-element to retain it in its operative relation, a series of other supports adapted to be secured to and extending from the bottom of the car-body, each support being provided with a bearing-portion, a rock-bar mounted in said bearing-portions, and a drop-fender or guard connected with said rock-bar, a pair of upwardly extending carriers connected with said rock-bar, and a roller upon each carrier with which the rods which carry the upper fender-element are adapted to be brought in engagement for retaining said drop-fender in its raised position, substantially as and for the purposes set forth.

14. In a car-fender, the combination, with two sets of rods extending longitudinally beneath the body of a car, of a fender-element or guard, means for pivotally connecting said element upon one set of rods, and means upon said other rods for engaging a portion of said fender-element to retain it in its operative relation, substantially as and for the purposes set forth.

15. In a car-fender, the combination, with two sets of rods extending longitudinally beneath the body of a car, of a fender element or guard, means for pivotally connecting said element upon one set of rods, and hook-shaped retaining ends upon said other rods for engaging portions of said fender-element to retain it in its operative relation, substantially as and for the purposes set forth.

16. In a car fender, the combination, with two sets of rods extending longitudinally beneath the body of a car, one of said sets of rods being pivotally connected with said other set of rods, and both sets of rods being capable of reciprocatory movements, of a fender-element, means for pivotally connecting said element upon one set of rods, and means upon said other rods for engaging a portion of said fender-element to retain it in its operative relation, substantially as and for the purposes set forth.

17. In a car-fender, the combination, with two sets of rods extending longitudinally beneath the body of a car, one of said sets of rods being pivotally connected with said other set of rods, and both sets of rods being capable of reciprocatory movements, of a fender-element, means for pivotally connecting said element upon one set of rods, and hook-shaped retaining ends upon said other rods for engaging portions of said fender-element to retain it in its operative relation, substantially as and for the purposes set forth.

18. In a car-fender, in combination, two sets of rods extending longitudinally beneath the body of a car, one of said sets of rods being pivotally connected with said other set of rods, and being provided with tubular receiving portions, short rods removably arranged in said receiving portions, means for securing said short rods in place, and a means of pivotal connection upon one end of each short rod, a fender-element mounted upon said means of pivotal connection, and means upon said other rods for engaging a portion of said fender-element to retain it in its operative position, substantially as and for the purposes set forth.

19. In a car-fender, in combination, two sets of rods extending longitudinally beneath the body of a car, one of said sets of rods being pivotally connected with said other set of rods, and being provided with tubular receiving portions, short rods removably arranged in said receiving portions, means for securing said short rods in place, and a means of pivotal connection upon one end of each short rod, a fender-element mounted upon said means of pivotal connection, and hook-shaped retaining ends upon said other rods for engaging portions of said fender-element to retain it in its operative relation, substantially as and for the purposes set forth.

20. In a car-fender, in combination, supports adapted to be secured upon the bottom of a car-body, said supports being provided with bearing-portions, a rock-bar mounted in said bearing portions, and a fender-element secured to said rock-bar, carriers extending rearwardly and upwardly from said rock-bar, a grooved roller upon each carrier, and means adapted to be brought in engagement with said rollers for retaining said fender-element in its raised relation, substantially as and for the purposes set forth.

21. In a car-fender, in combination, supports adapted to be secured upon the bottom of a car-body, said supports being provided with bearing-portions, a rock-bar mounted in said bearing-portions, a fender-element comprising side-bars 19 and laterally extending cross-bars 17 and 18, and brackets 13 secured upon said rock-bar, said brackets being provided with oppositely extending arms 15 and 16 and means for securing said arms respectively to said cross-bars 17 and 18, substantially as and for the purposes set forth.

22. In a car-fender, in combination, supports adapted to be secured upon the bottom of a car-body, said supports being provided with bearing-portions, a rock-bar mounted in said bearing-portions, a fender-element comprising side-bars 19 and laterally extending cross-bars 17 and 18, and brackets 13 secured upon said rock-bar, said brackets being provided with oppositely extending arms 15 and 16 and means for securing said arms respectively to said cross-bars 17 and 18, other laterally extending cross-bars 21 between said side-bars 19, and rollers mounted on some of said cross-bars 21, substantially as and for the purposes set forth.

23. In a car-fender, in combination, supports adapted to be secured upon the bottom of a car-body, said supports being provided with bearing-portions, a rock-bar mounted in said bearing-portions, a fender-element comprising side-bars 19 and laterally extending cross-bars 17 and 18, and brackets 13 secured upon said rock-bar, said brackets being provided with oppositely extending arms 15 and 16, and means for securing said arms respectively to said cross-bars 17 and 18, carriers extending rearwardly and upwardly from said rock-bar, a grooved roller upon each carrier, and means adapted to be brought in engagement with said rollers for retaining said fender-element in its raised relation, substantially as and for the purposes set forth.

24. In a car-fender, in combination, supports adapted to be secured upon the bottom of a car-body, said supports being provided with bearing-portions, a rock-bar mounted in said bearing-portions, and a fender-element secured to said rock-bar, carriers extending rearwardly and upwardly from said rock-bar, a grooved roller upon each carrier, all combined with longitudinally moving and oscillating rods 38 adapted to be brought in engagement with said rollers for retaining said fender-element in its raised relation, substantially as and for the purposes set forth.

In testimony, that we claim the invention set forth above we have hereunto set our hands this 24th day of July 1907.

LEO OLSCHEWSKI.
FRANK TRENSCH.

Witnesses:
FREDK. C. FRAENTZEL,
ANNA H. ALTER.